US008024727B2

(12) United States Patent
Taillefer et al.

(10) Patent No.: US 8,024,727 B2
(45) Date of Patent: Sep. 20, 2011

(54) ENHANCING OR REPLACING HOST OPERATING SYSTEM FUNCTIONALITY BY LEVERAGING GUEST OPERATING SYSTEM FUNCTIONALITY

(75) Inventors: Martin Taillefer, Redmond, WA (US); Stanley W. Adermann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1465 days.

(21) Appl. No.: 11/454,372

(22) Filed: Jun. 15, 2006

(65) Prior Publication Data
US 2007/0294690 A1    Dec. 20, 2007

(51) Int. Cl.
*G06F 9/455* (2006.01)
*G06F 13/00* (2006.01)
(52) U.S. Cl. ............................................. 718/1; 719/324
(58) Field of Classification Search ....... 718/1; 719/324
See application file for complete search history.

(56) References Cited

U.S. PATENT DOCUMENTS

| 4,674,038 | A | 6/1987 | Brelsford et al. | 364/200 |
|---|---|---|---|---|
| 5,038,281 | A | 8/1991 | Peters | 364/200 |
| 5,655,154 | A | 8/1997 | Jain et al. | 395/899 |
| 6,530,078 | B1 | 3/2003 | Shmid et al. | 171/138 |
| 6,782,443 | B2 | 8/2004 | Ferguson | 710/313 |
| 6,895,491 | B2 | 5/2005 | Kjos et al. | 711/203 |
| 6,922,774 | B2 | 7/2005 | Meushaw et al. | 713/151 |
| 6,966,062 | B2 | 11/2005 | Gregg et al. | 718/104 |
| 7,020,738 | B2 | 3/2006 | Neiger et al. | 711/6 |
| 7,228,337 | B1 * | 6/2007 | Bornstein et al. | 709/217 |
| 2002/0194241 | A1 | 12/2002 | Griffin et al. | 709/1 |
| 2004/0199927 | A1 | 10/2004 | Liu et al. | 719/328 |
| 2005/0091029 | A1 | 4/2005 | Traut | 703/27 |
| 2005/0132367 | A1 * | 6/2005 | Tewari et al. | 718/1 |
| 2005/0268336 | A1 | 12/2005 | Finnegan | |
| 2006/0005186 | A1 | 1/2006 | Neil | 718/1 |
| 2006/0005190 | A1 | 1/2006 | Vega et al. | 718/1 |
| 2006/0015316 | A1 | 1/2006 | Siahaan et al. | 703/27 |
| 2007/0050765 | A1 * | 3/2007 | Geisinger | 718/1 |

FOREIGN PATENT DOCUMENTS
WO    WO 2005/036358    4/2005

OTHER PUBLICATIONS

Lehrman, Rick. "Indrema: a Linux based high-end game console—and more", Jul. 2, 2000.*

(Continued)

*Primary Examiner* — Meng A An
*Assistant Examiner* — Brian Chew
(74) *Attorney, Agent, or Firm* — Woodcock Washburn LLP

(57) ABSTRACT

Techniques for enhancing or replacing host operating system functionality by leveraging guest operating system functionality are disclosed. Incoming data is received from a computing resource of a host operating system, and, before the incoming data is transmitted to a higher-level module in the host operating system, the incoming data is intercepted by a set of one or more leveraged guest modules in a guest operating system. After intercepting the incoming data, the leveraged guest modules perform one or more operations on the incoming data. The leveraged guest modules may provide more advanced support and capabilities to perform these operations than any counterpart functionality in the host operating system. In addition to performing these operations, the leveraged guest modules also determine whether or not to return the incoming data to the host operating system.

18 Claims, 6 Drawing Sheets

OTHER PUBLICATIONS

Dunlap, G.W. et al., "ReVirt: Enabling Intrusion Analysis through Virtual-Machine Logging and Replay", 5$^{th}$ *Symposium on Operating Systems Design and Implementation*, http://delivery.acm.org, 211-223.

Moss, J., "Running Windows Applications under Linux, Putting Windows in its Place", *Linux Magazine*, 2000, http://www.linux-magazine.com/issue/01/Windows_Linux_Integration.pdfVMware, 54-57.

"z/VM and VM/ESA Direction", http://www.3.ca.com/Files/WhitePapers/vm_roadmap_080803.pdf, Aug. 2003, 5 pages.

Okumura, T. et al., "Operating System upport for Network Control: A Virtual Network Interface Approach for End-Host OSs", May 15-17, 2002, *Quality of Service, Tenth IEEE International Workshop*, 170-179, http://ieeexplore.ieee.org/search/freesrchabstract.jsp?arnumber=100658, Abstract Only, 1 page.

Uhlig, R. et al., "Intel Virtualization Technology", *Computer*, 2005, 38(5), 48-56, http://ieeexplore.ieee.org/search/freesrchabstract.jsp?arnumber=143063, Abstract Only, 1 page.

"Definition of Intercept", http://dictionary.reference.com/browse/intercept, accessed Mar. 4, 2011, 2 pages.

\* cited by examiner

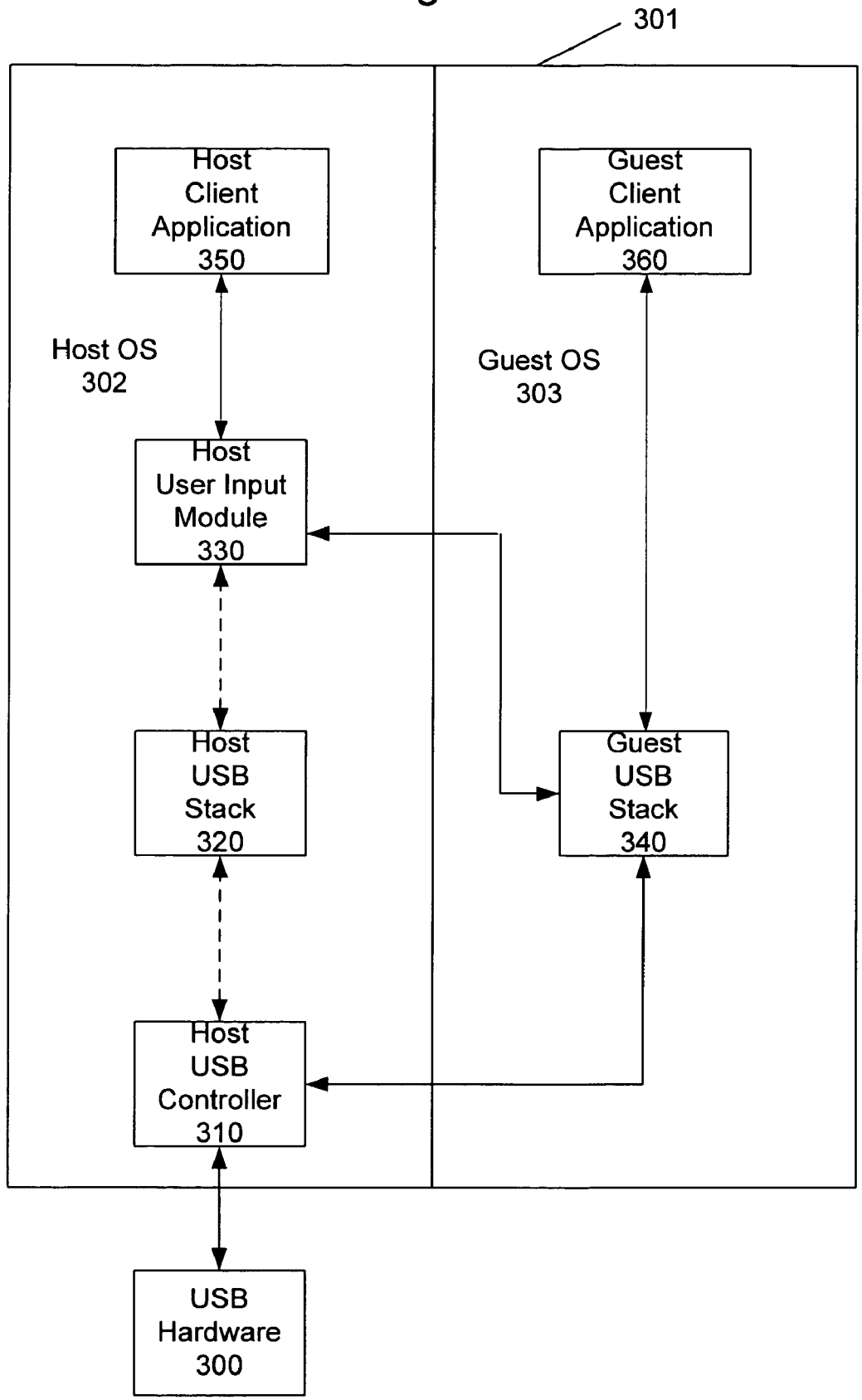

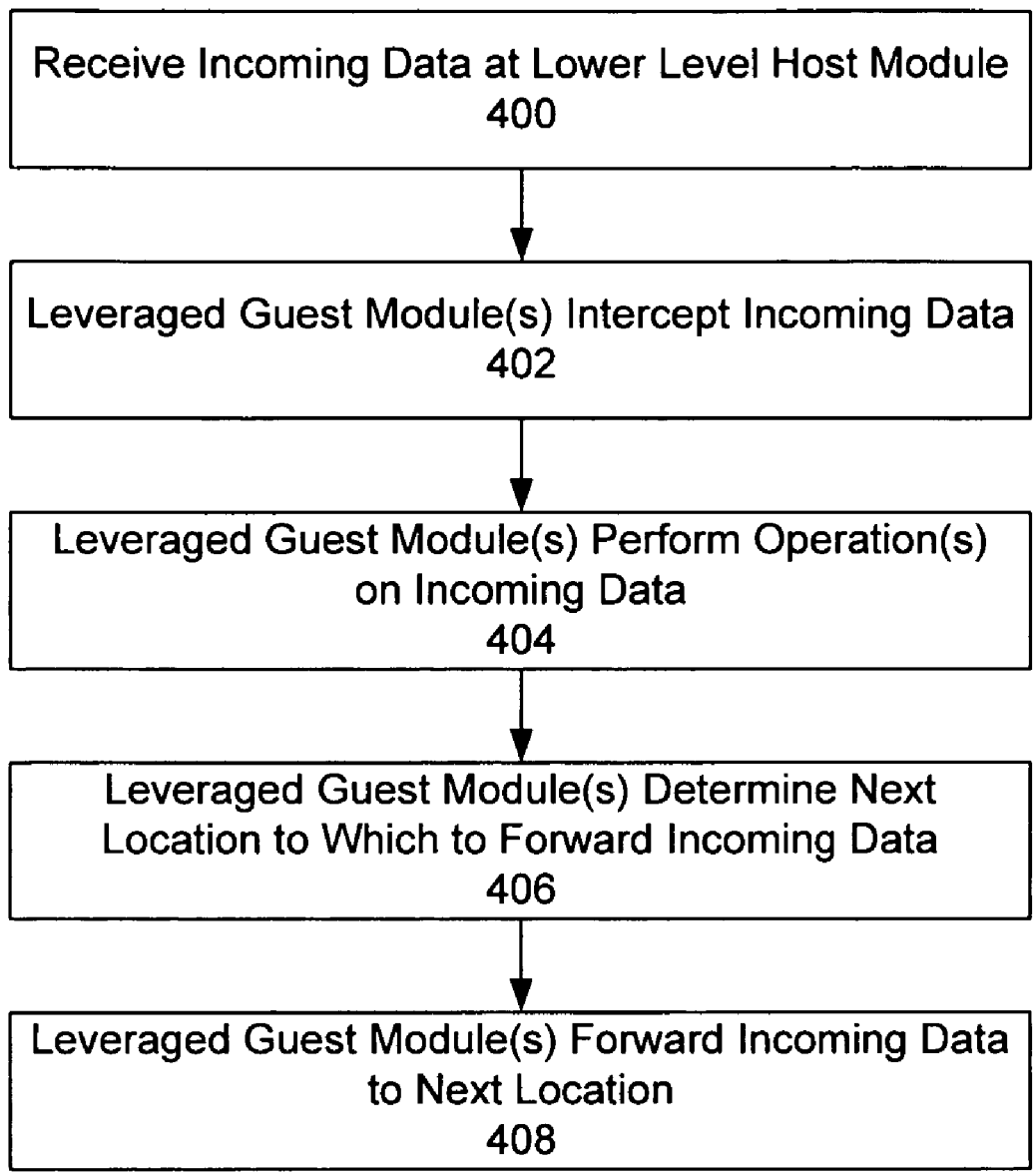

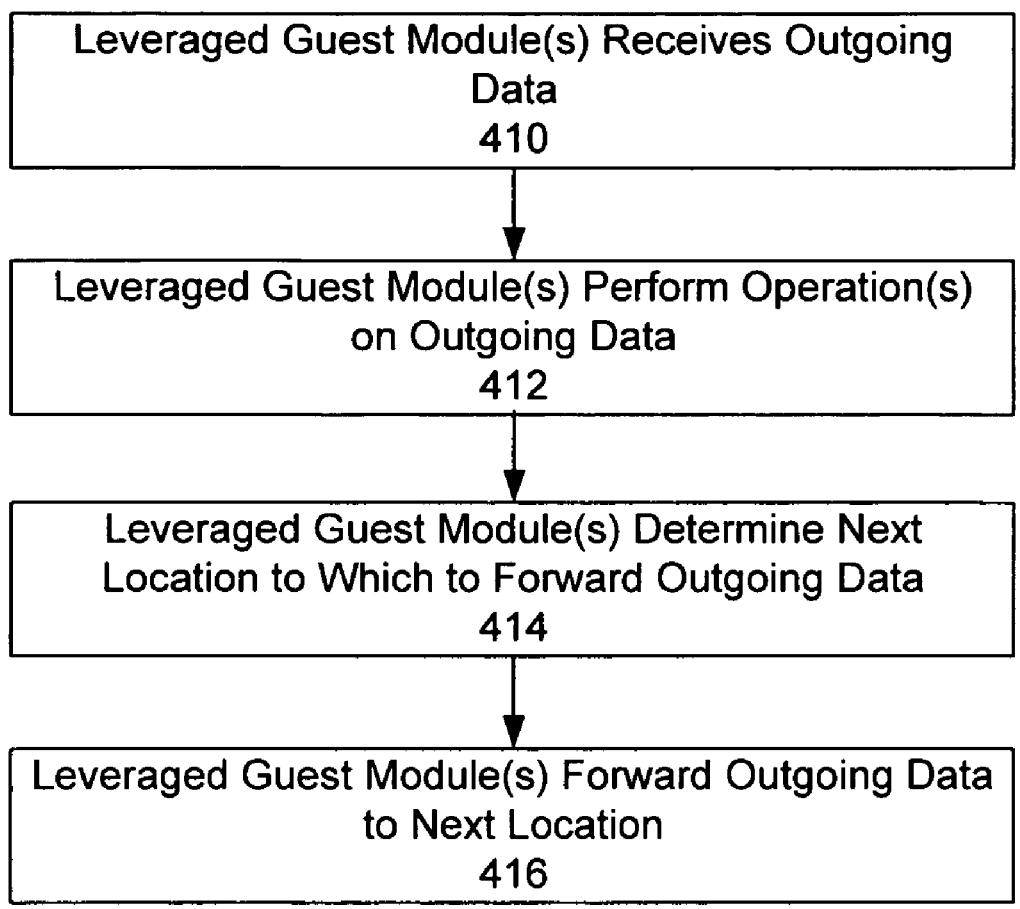

ENHANCING OR REPLACING HOST OPERATING SYSTEM FUNCTIONALITY BY LEVERAGING GUEST OPERATING SYSTEM FUNCTIONALITY

CROSS REFERENCE TO RELATED APPLICATION

This application is related by subject matter to U.S. patent application Ser. No. 11/454,215, filed Jun. 15, 2006, entitled "Enhancing or Replacing Host Operating System Functionality by Leveraging Guest Operating System Functionality", which is hereby incorporated by reference in its entirety.

BACKGROUND

Operating system virtualization enables a number of different operating systems to execute on a single host computing device, thereby expanding the number of applications that can be executed on the host computing device and expanding the capabilities of the host computing device. In an operating system virtualization environment, the host computing device includes a host operating system that runs directly on the physical hardware of the host device. To achieve operating system virtualization, the host operating system may execute an emulator program that creates an environment sufficient to run another operating system, which is referred to as a guest operating system. For example, a game console computing device may execute a host game console operating system such as the Xbox operating system from MICROSOFT Corp. of Redmond, Wash. Through emulation, the game console may create an environment adequate to execute a guest operating system, such as the Windows operating system also from the above mention MICROSOFT Corp.

One problem that occurs in the operating system virtualization context relates to computing resources such as data storage devices, data input and output devices, networking devices, etc. Because each of host computing device's multiple operating systems may have different functionality, there is a question as to which computing resources should be apportioned to which of the multiple operating systems. For example, a virtualized host computing device may include only a single network interface card (NIC) that enables the host computing device to communicate with other networked computers. This scenario raises the question of which of the multiple operating systems on the virtualized host should be permitted to interact with and control the NIC.

One potential solution to this problem is to simply grant the host operating system exclusive access and control over the host computing device's resources. While this solution is relatively straightforward, it is disadvantageous because it restricts the host computing device's capabilities to the capabilities of the host operating system. This may not be problematic when the host operating system offers the most advanced capabilities for using a particular resource. However, when a guest operating system offers more advanced capabilities for using a resource than does the host operating system, it becomes wasteful to not leverage the guest's capabilities.

To illustrate this concept, consider the above example of a host game console with a host game console operating system and a guest PC operating system. PC operating systems may include advanced computer networking capabilities such as support for advanced Internet addressing protocols such as IPv6 and security protocols such as IPSec. By contrast, because they are not specifically developed for general-purpose network use, game console operating systems may not include advanced networking capabilities such as those described above. Thus, if the host game console includes only a single NIC card, and the host game console operating system is granted exclusive access and control over the single NIC card, then the advanced networking capabilities of the PC operating system may not be available to the user of the game console. Rather, the game console may be restricted to the limited networking capabilities of the game console operating system.

Another potential solution to the problem of allocating computing resources is to attempt to increase the number of resources available to a host computing device. For example, a game console that executes two operating systems could be equipped with two NIC's. While this is another straightforward solution to the problem, it is also disadvantageous because it raises the cost of the host computing device. Moreover, additional access to computing resources may not always be available to all of the virtualized operating systems on a virtualized computing device.

Thus, what is needed is a way to allocate computing resources between a host operating system and a guest operating system in an efficient and cost effective manner such that the host computing device is not necessarily limited to the capabilities of the host operating system.

SUMMARY

Techniques for enhancing or replacing host operating system functionality by leveraging guest operating system functionality are disclosed. These techniques may be applied to a virtualized computing device with a host operating system and at least one guest operating system. Incoming data is received from a computing resource of the host operating system, and, before the incoming data is transmitted to a higher level module in the host operating system, the incoming data is intercepted by a set of one or more leveraged guest modules in the guest operating system. After intercepting the incoming data, the leveraged guest modules perform one or more operations on the incoming data. The leveraged guest modules may provide more advanced capabilities for performing these operations than any counterpart functionality in the host operating system. In addition to performing these operations, the leveraged guest modules also determine whether or not the data is ultimately directed to the host operating system. If the data is ultimately directed to the host operating system, then the leveraged guest modules filter out the incoming data and return the incoming data to a higher level module or client application in the host operating system. By contrast, if the data is directed to the guest operating system, then the leveraged guest modules may forward the incoming data to a higher level module or client application in the guest operating system.

The leveraged guest modules may also intercept outgoing data from a client application or higher level module in the host operating system. The leveraged guest modules may perform one or more operations on the outgoing data, and after performing these operations, the leveraged guest modules may then return the outgoing data to the host operating system to be sent to a computing resource of the host operating system.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which:

FIG. 3 is a block diagram representing an exemplary virtualized computing device that leverages guest Universal Serial Bus (USB) functionality;

FIGS. 4a and 4b are flowcharts representing exemplary methods for leveraging guest operating system functionality.

DETAILED DESCRIPTION

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

Figure 1:
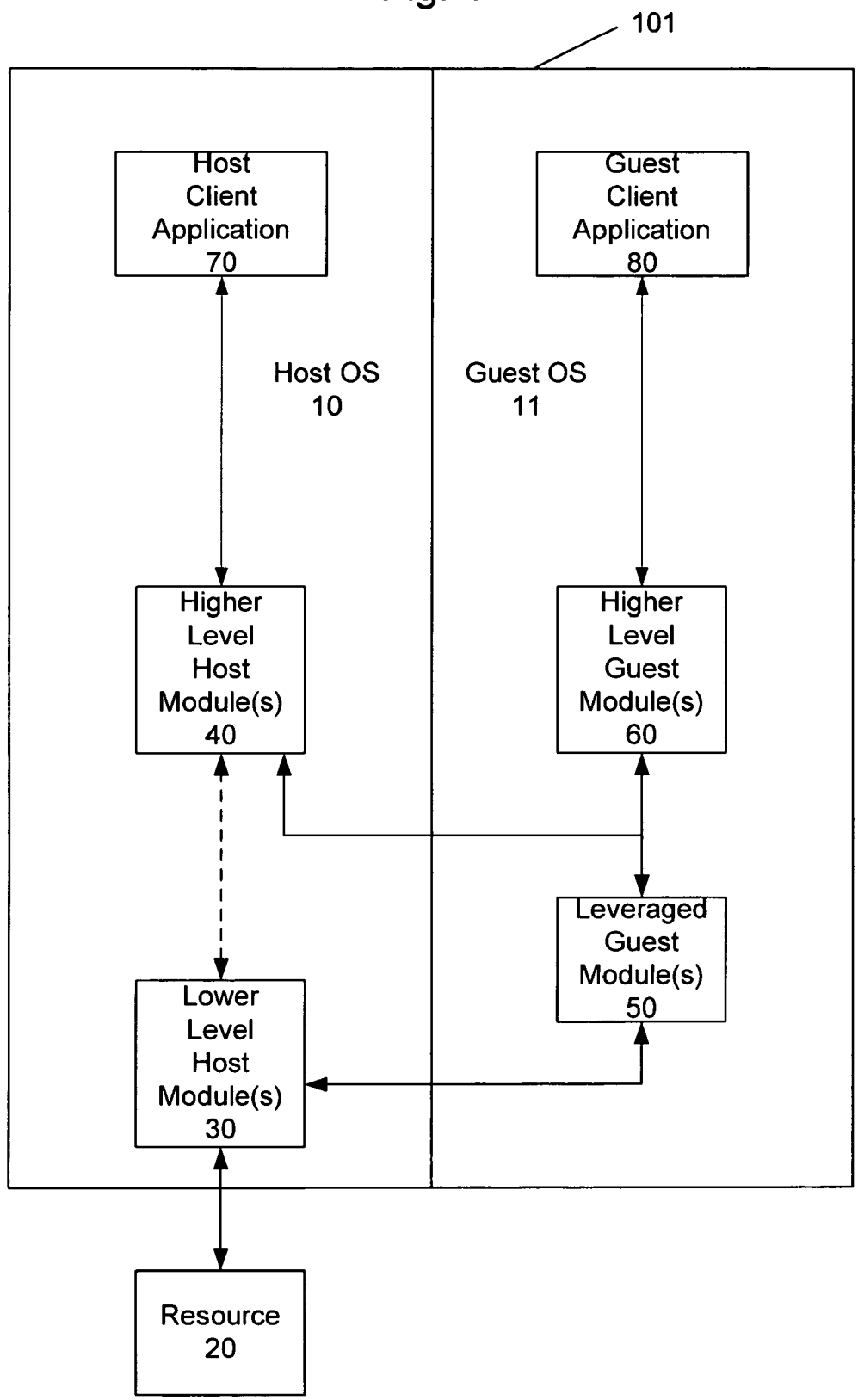
FIG. 1 is a block diagram representing an exemplary virtualized computing device that leverages a guest operating system functionality.

A block diagram representing an exemplary virtualized computing device that leverages guest operating system functionality is shown in FIG. 1. As shown, virtualized computing device 101 includes a host operating system 10 and a guest operating system 11. Computing device 101 may be, for example, a Personal Computer (PC), a game console, a server, a mobile computing device, or any other type of computing device. Host operating system 10 runs directly on the hardware of the computing device 101. Guest operating system 11 is a virtualized operating system. Guest operating system 11 may, for example, be enabled using an emulator program executing on host operating system 10. Host operating system 10 and guest operating system 11 may each be any type of operating system suitable for execution on any type of computing device 101.

Host client application 70 executes in the user mode of host operating system 10, while guest client application 80 executes in the user mode of guest operating system 11. Host operating system 10 and guest operating system 11 provide host client application 70 and guest client application 80, respectively, with access to computing resource 20. Resource 20 may be, for example, a data storage device, a data input/output device, a networking device, or any other resource that is useful to computing device 101. Resource 20 may be located within the physical structure of computing device 101 or may, as depicted in FIG. 1, be external to computing device 101. As should be appreciated, resource 20 may be a separate physical device or a component of a physical device such as computing device 101.

On its way between applications 70 or 80 and resource 20, data is routed through modules 30, 40, 50 and/or 60, which each process the data in some manner and then forward the processed data to a next location. The term module, as used herein, refers to any portion or complete set of code or a program that performs some functionality, such as, for example, but not limited to, a driver or a service. Each of modules 30, 40, 50 and/or 60 may constitute a portion of a module "stack" or may constitute a module "stack" in its entirety. As should be appreciated, although not depicted in FIG. 1, both host operating system 10 and guest operating system 11 may include any number of ports, buffers, or other locations interspersed between modules 30, 40, 50 and/or 60.

In conventional virtualization configurations which adhere to the traditional virtualization boundaries, data does not pass back and forth between virtualized operating systems. Thus, for example, in conventional configurations, when data is transferred between host client application 70 and resource 20, the data is passed directly from the lower level host module(s) 30 to the higher level host module(s) 40 (as represented by the dashed line shown in FIG. 1). However, in the system of FIG. 1, data does not pass directly from the lower level host module(s) 30 to the higher level host module(s) 40. Rather, the data is intercepted by leveraged guest module(s) 50.

As will be described in detail below, routing data through leveraged guest module(s) 50 as shown in FIG. 1 enables host operating system 10 to replace or enhance its own functionality by leveraging the functionality of leveraged guest module(s) 50. If leveraged guest module(s) 50 provide more advanced capabilities for supporting resource 20 than does host operating system 10, then routing data through leveraged guest module(s) 50 as shown in FIG. 1 effectively expands the capabilities of host operating system 10 for supporting resource 20. By contrast, when, as in conventional configurations, data is transferred directly between lower level host module(s) 30 and higher level host module(s) 40, host operating system 10 is restricted to its own capabilities for supporting resource 20, which may be limited in comparison to those of guest operating system 11.

As shown in FIG. 1, both incoming data (e.g., data that is received from resource 20) and outgoing data (e.g., data that is sent to resource 20) may be routed through leveraged guest module(s) 50. Leveraged guest modules 50 process the incoming or outgoing data in some manner and determine the next location to which to send the incoming or outgoing data. For incoming data, leveraged guest modules 50 are capable of identifying incoming data that is ultimately directed to host operating system 10. After processing the incoming data, leveraged guest modules 50 will filter it out and return it to an appropriate higher level location in host operating system 10. Also, if the data is ultimately directed to guest operating system 11, then leveraged guest modules 50 will, after processing the incoming data, forward it to an appropriate higher level location in guest operating system 10. For outgoing data, the leveraged guest modules are capable of receiving outgoing data from higher level locations in either host operating system 10 or guest operating system 11, processing the outgoing data, and then forward the outgoing data an appropriate lower level location and, ultimately, to resource 20.

Although not depicted in FIG. 1, computing device 101 may include more than one virtualized guest operating system. In this scenario, if one of the other guest operating systems is the ultimate destination for incoming data, then leveraged guest module(s) 50 may, after processing the incoming data, forward the incoming data to an appropriate higher level location in the other guest operating system. Additionally, leveraged guest module(s) 50 may receive outgoing data from any of the other guest operating systems, process the outgoing data, and then forward the outgoing data an appropriate lower level location and, ultimately, to resource 20.

As mentioned above, leveraged guest module(s) 50 may provide more advanced and/or expanded capabilities for supporting a resource 20 than does host operating system 10. To illustrate this concept, two specific examples of leveraging guest operating system functionality will be described in detail below with reference to FIGS. 2 and 3. As should be appreciated, however, any number of other configurations with different types of resources, leveraged guest modules, and other components may also be employed to leverage guest operating system functionality. For example, when a host operating system's functionality does not include windowing, the host operating system may leverage a guest operating system windowing environment.

Figure 2:
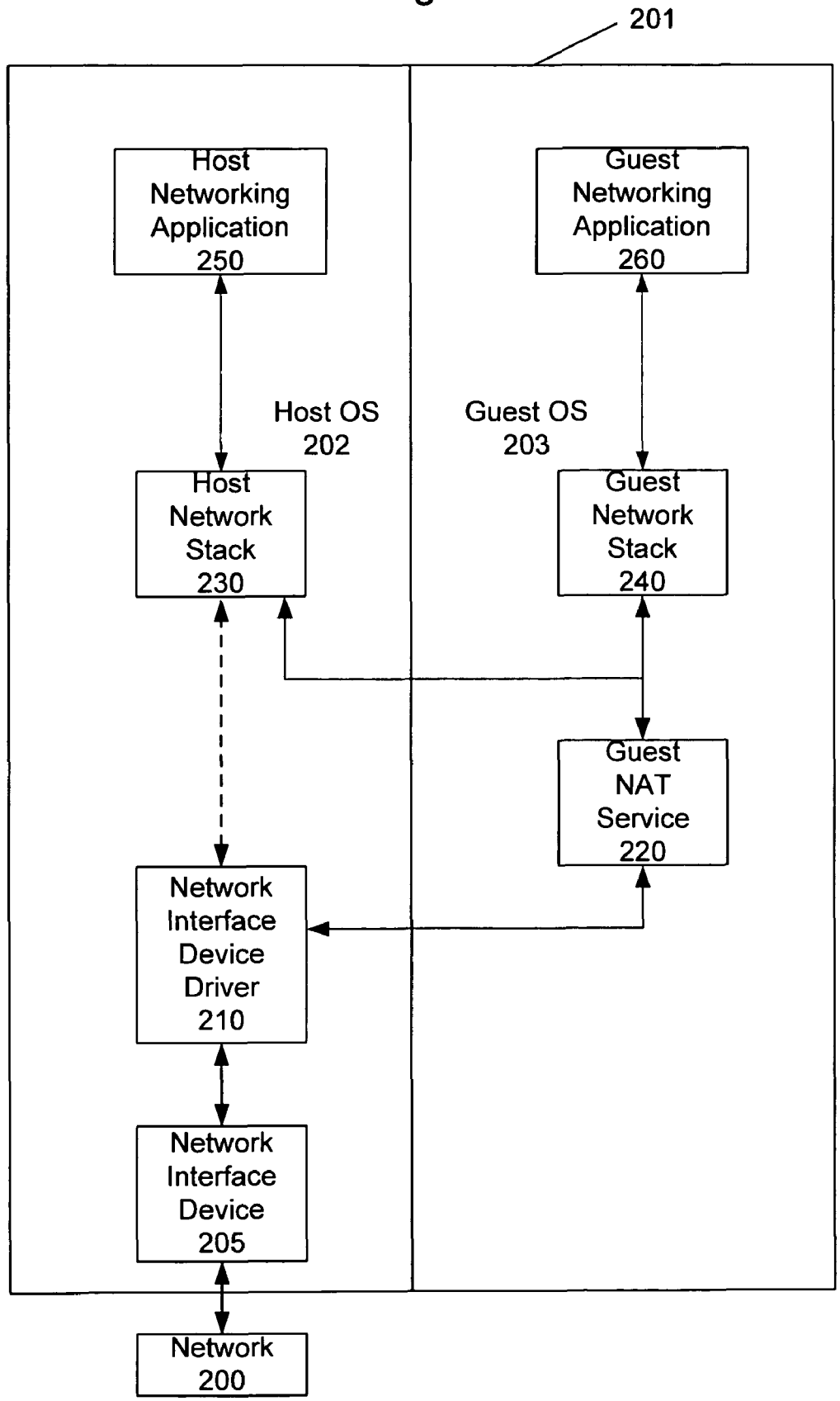
FIG. 2 is a block diagram representing an exemplary virtualized computing device that leverages a guest NAT service.

A block diagram representing an exemplary virtualized computing device that leverages a guest network address translation (NAT) service is depicted in FIG. 2. In FIG. 2, the particular resource that is being controlled is network interface device 205, which is a device or component that provides access to network 200. Network interface device 205 may be, for example, a network interface card (NIC). Network interface device driver 210 provides code for accessing and controlling network interface device 205. Host network stack 230 and guest network stack 240 each provide one or more modules for processing outgoing data for transmission over network 200 and for processing incoming data that is received from network 200. Network stacks 230 and 240 may, for example, include modules for processing data in accordance with well known protocols such as Point to Point protocol (PPP), Transmission Control Protocol (TCP), and Internet Protocol (IP). Host networking application 250 and guest networking application 260 are applications executing on host operating system 202 and guest operating system 203, respectively, that access network 200.

In the example of FIG. 2, host operating system 202 is an operating system with more limited networking capabilities, while guest operating system 203 is an operating system with more advanced networking capabilities. For example, as shown in FIG. 2, guest operating system 203 provides NAT service 220, while host operating system 202 does not provide a NAT service. The use of guest NAT service 220 to provide advanced networking capabilities will be described in detail below. In addition to NAT service 220, guest operating system 203 may provide a number of other advanced networking capabilities which are not depicted in FIG. 2. For example, guest operating system 203 may, for example, support more recently developed Internet addressing protocols such as IPv6 and Internet security protocols such as IPSec. Guest operating system 203 may also, for example, support advanced firewall, virtual private network (VPN), and Quality of Service (QoS) capabilities. By contrast, host operating system 202 may not provide any or all of these or other advanced networking capabilities.

One exemplary scenario in which a host operating system with limited networking capabilities may execute in combination with a guest operating system with more advanced networking capabilities is when computing device 201 is a game console, host operating system 202 is a game console operating system, and guest operating system 203 is a PC operating system. Many game console operating systems have limited networking capabilities in comparison to personal computer (PC) operating systems. However, the example of FIG. 2 is not limited to scenarios in which computing device 201 is a game console, host operating system 202 is a game console operating system and guest operating system 203 is a PC operating system. Additionally, although FIG. 2 depicts host operating system 202 as not providing NAT services, this need not necessarily be the case. For example, in some scenarios, host operating system 202 may also provide NAT services, but such host NAT services may be limited in their capabilities, thereby creating an incentive to leverage more advanced guest NAT services 220.

As mentioned above, in conventional computing devices which adhere to the traditional virtualization boundary, data does not pass back and forth between virtualized operating systems. Thus, for example, in conventional configurations, when data is transferred between host networking application 250 and network 200, the data is passed directly from the host network stack 230 to the network interface device driver 210 (as represented by the dashed line shown in FIG. 2). However, in the system of FIG. 2, data does not pass directly from the host network stack 230 to the network interface device driver 210. Rather, the data is intercepted by guest NAT service 220, which, in this case, is the leveraged guest module.

In the system of FIG. 2, host operating system 202 enhances its limited networking capabilities by leveraging the advanced networking capabilities of guest NAT service 220. Specifically, guest NAT service 220 enables both guest operating system 203 and host operating system 202 to access the Internet. Guest NAT service 220 accomplishes this by assigning both host operating system 202 and guest operating system 203 a private internal NAT address and then converting the private internal NAT addresses to and from public external IP addresse(s). Thus, for example, when the host operating system 202 sends outgoing data through network interface device 205, NAT service 220 will translate the source address of the data from the host operating system's private NAT address to a public IP address. Conversely, when incoming data received through network interface device 205 is ultimately directed to host operating system 202, NAT service 220 will translate the destination address of the data from a public IP address to the host operating system's private NAT address to route the incoming data to the host operating system 202.

In addition to enabling both host operating system 202 and guest operating system 203 to access the Internet through a single network interface device 205, the layout shown in FIG. 2 may enable host operating system 202 to leverage other advanced networking capabilities of guest operating system 203. For example, if guest NAT services support advanced Internet addressing and security protocols such as IPv6 and IPSec, then the layout shown in FIG. 2 will enable host operating system 202 to effectively leverage these advanced capabilities.

Another example of leveraging guest operating system functionality is illustrated in FIG. 3. Specifically, FIG. 3 depicts a block diagram representing an exemplary computing device 301 that leverages guest Universal Serial Bus (USB) functionality. In FIG. 3, the particular resource that is being controlled is USB hardware 300 such as, for example, a USB keyboard, a USB game controller, a USB storage device, etc. USB controller 310 is a low level host module that controls and provides access to USB hardware 300. Host USB stack 320 and guest USB stack 340 are components of host OS 302 and guest OS 303, respectively, for processing and directing incoming and outgoing data to and from USB hardware 300. USB stacks 320 and 340 may each include one or more modules such as, for example, a composite USB driver and/or one or more individual component USB drivers. A component USB driver may be, for example, a USB keyboard driver, a USB game controller driver, a USB storage device driver, etc. Host client applications 350 and guest client applications 360 are applications executing on host operating system 302 and guest operating system 303, respectively, that request and/or receive USB data.

In the example of FIG. 3, host operating system 302 is an operating system with more limited USB capabilities, while guest operating system 303 is an operating system with more advanced USB capabilities. For example, guest USB stack 340 may include modules that provide support for a larger number of USB file storage formats, while host USB stack 320 may include modules that provide support for only a smaller number of USB file storage formats. Thus, for example, guest USB stack 340 may support and, therefore, provide access to a particular file storage device that host USB stack 320 does not support. Guest USB stack may also, for example, provide advanced USB capabilities such as enhanced isochronous packet scheduling or enhanced power management. By contrast, host USB stack 320 may not provide these or other advanced USB capabilities.

One exemplary scenario in which a host operating system with limited USB support capabilities may execute in combination with a guest operating system with more advanced USB support capabilities is when computing device 301 is a game console, host operating system 302 is a game console operating system, and guest operating system 303 is a PC operating system. Many game console operating systems have limited USB support capabilities in comparison to personal computer (PC) operating systems. However, the example of FIG. 3 is not limited to scenarios in which computing device 301 is a game console, host operating system 302 is a game console operating system, and guest operating system 303 is a PC operating system.

In conventional virtualization configurations which adhere to the traditional virtualization boundaries, data does not pass back and forth between virtualized operating systems. Thus, for example, in conventional configurations, when data is transferred between host client application 350 and USB hardware 300, the data is passed through and is processed by host USB stack 320 (as represented by the dashed lines shown in FIG. 3). However, in the system of FIG. 3, the host USB stack 320 is bypassed and the data is instead intercepted and processed by guest USB stack 340, which, in this case, serves as the leveraged guest modules. Thus, in the system of FIG. 3, host operating system 302 enhances its limited USB capabilities by leveraging the advanced USB capabilities of guest USB stack 340.

One or more modules within guest USB stack 340 may be capable of identifying and filtering out incoming USB data that is ultimately directed to host operating system 302. After identifying this data, guest USB stack 340 may direct the incoming data back to host user input module 330 in host operating system 302. As should be appreciated, it is not necessary to always bypass the entire host USB stack 320. Rather, computing device 301 may be configured such that only some of the modules within host USB stack 320 are bypassed.

Flowcharts representing exemplary methods for leveraging guest operating system functionality are shown in FIGS. 4a and 4b. Specifically, FIG. 4a depicts an exemplary method for leveraging guest operating system functionality with respect to incoming data received from a computing resource. As shown in FIG. 4a, at act 400, incoming data from a resource is received at a lower level host module in the host operating system. The resource from which the data is received may be, for example, network interface device 205 of FIG. 2 or USB hardware 300 of FIG. 3. The lower level host module that receives the data may be, for example, network interface device driver 210 of FIG. 2 or host USB controller 310 of FIG. 3.

At act 402, leveraged guest module(s) in the guest operating system intercept the incoming data from the host operating system. The leveraged guest module(s) may be, for example, guest NAT service 220 of FIG. 2 or guest USB stack 340 of FIG. 3. In some cases, the leveraged guest module(s) may provide services which do not exist at all in the host operating system. For example, in FIG. 2, unlike guest operating system 203, host operating system 202 does not provide NAT services. Additionally, the leveraged guest module(s) may also provide services or functionality that has more advanced capabilities than counterpart functionality in the host operating system. For example, guest USB stack 340 of FIG. 3 provides more advanced USB support capabilities than does counterpart host USB stack 320.

At act 404, the leveraged guest module(s) perform one or more operations on the incoming data. For example, as described above, Guest NAT services 220 of FIG. 2 may perform a network address translation on the incoming data. In particular, if the incoming data is directed to the host operating system, then guest NAT services 220 may translate the incoming data's destination address from a public external IP address to a private internal NAT address of the host operating system. As another example of performing operations on incoming data, guest USB stack 340 of FIG. 3 may include a composite USB driver and individual component USB drivers that process the incoming data in accordance with USB protocol.

At act 406, the leveraged guest module(s) determine the next location to which to forward the incoming data. If the incoming data is ultimately directed to the host operating system, then leveraged guest modules will identify an appropriate higher level module or client application in the host operating system to which to forward the incoming data. If the incoming data is ultimately directed to the guest operating system, then the leveraged guest modules will identify an appropriate higher level module or client application in the host operating system to which to forward the incoming data. Additionally, if the incoming data is ultimately directed to another guest operating system executing on the host computing device, then the leveraged guest modules will identify an appropriate higher level module or client application in the other guest operating system to which to forward the incoming data. At act 408, the leveraged guest module(s) forward the incoming data to the appropriate next location.

FIG. 4b depicts an exemplary method for leveraging guest operating system functionality with respect to outgoing data being sent to a computing resource. As shown in FIG. 4b, at act 410, the leveraged guest module(s) receive the outgoing data from a client application or higher level module in any of the operating systems executing on the host computing device. For example, as shown in FIG. 2, leveraged guest NAT service 220 may receive outgoing data from host network stack 230, guest network stack 240, or possibly other modules or applications. Additionally, as shown in FIG. 3, leveraged guest USB stack 340 may receive outgoing data from host user input module 330, guest client applications 360, or possibly other modules or applications.

At act 412, the leveraged guest module(s) perform one or more operations on the outgoing data. For example, as described above, Guest NAT service 220 of FIG. 2 may perform a network address translation on the outgoing data. In particular, if the outgoing data is received from the host operating system, then guest NAT services 220 may translate the outgoing data's origination address from a private internal NAT address of the host operating system to a public external IP address. As another example of performing operations on outgoing data, guest USB stack 340 of FIG. 3 may include a composite USB driver and individual component USB drivers that process the outgoing data in accordance with USB protocol.

At act 414, the leveraged guest module(s) determine a next location to which to forward the outgoing data. If the outgoing data is directed to a computing resource of the host operating system, then the next location will likely be a lower level module in the host operating system that controls and provides access to the computing resource. For example, in FIG. 2, network interface device driver 210 is a lower level host module that controls and provides access to network interface device 205. In FIG. 3, host USB controller 310 is a lower level host module that controls and provides access to USB hardware 300. At act 416, the leveraged guest module(s) forward the outgoing data to the appropriate next location.

Figure 5:
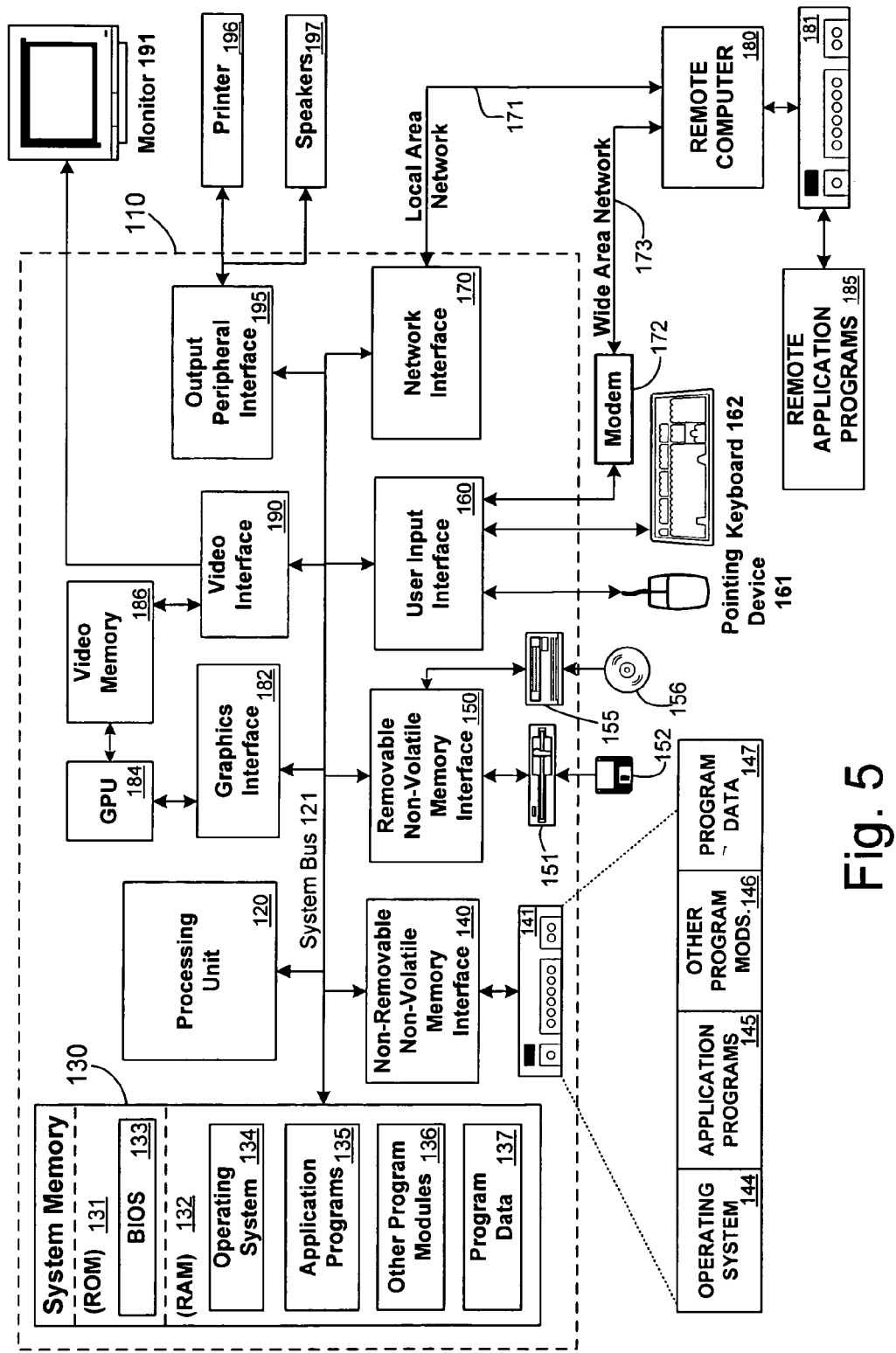
FIG. 5 is a block diagram representing an exemplary computing device.

FIG. 5 illustrates an example of a suitable computing system environment 100 in which the subject matter described above may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 5, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5 provide storage of computer readable instructions, data structures, program modules and other data for the computer 110. In FIG. 5, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 10 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A method for leveraging a network address translation (NAT) service of a guest operating system (OS) executing on a host computing device, the method comprising:
   receiving by a network interface device of a host OS data from a network, the host OS executing on the host computing device;
   transmitting the data from the network interface device to a network interface device driver of the host OS;
   intercepting by the NAT service the data as it is directed from the network interface device driver to a host network stack of the host OS;
   identifying by the NAT service a destination OS that is an ultimate destination for the data, the destination OS being the host OS or the guest OS; and
   storing an indication of the destination OS in a memory of the host computing device.

2. The method of claim 1, further comprising:
   translating a destination address of the data to a private internal network address of the host OS; and
   forwarding the data to the host network stack.

3. The method of claim 1, further comprising:
   identifying by the NAT service that another guest OS executing on the host computing device is the destination OS.

4. The method of claim 3, further comprising:
   translating a destination address of the data to a private internal network address of the another guest OS; and
   forwarding the data to a network stack of the another guest OS.

5. The method of claim 1, further comprising:
   receiving by the NAT service second data from an origination OS that is the host OS or the guest OS;
   translating by the NAT service the second data from a private internal network address of the origination OS to a public external Internet Protocol (IP) address; and
   sending the second data to the network interface device of the host OS for transmission over the network.

6. A system for leveraging a network address translation (NAT) service of a guest operating system (OS), the system comprising:
   a processor; and
   a memory communicatively coupled to the processor when the system is operational, the memory bearing processor-executable instructions that, when executed upon the processor, cause the following operations to be performed:
     receiving by a network interface device of a host OS data from a network the host OS executing on the host computing device;
     transmitting the data from the network interface device to a network interface device driver of the host OS;
     intercepting by the NAT service the data as it is directed from the network interface device driver to a host network stack of the host OS;
     identifying by the NAT service a destination OS that is an ultimate destination for the data, the destination OS being the host OS or the guest OS; and
     storing an indication of the destination OS in a memory of the host computing device.

7. The system of claim 6, wherein the destination OS is another guest OS executing on the host computing device.

8. The system of claim 7, wherein the NAT service translates a destination address of the data to a private internal network address of the destination OS.

9. The system of claim 7, wherein the NAT service supports Internet Protocol version six (IPv6).

10. The system of claim 7, wherein the NAT service supports IPsec security protocol.

11. The system of claim 7, wherein the host OS does not provide a NAT service.

12. The system of claim 7, wherein the host computing device is a game console, the host OS is a game console OS, and the guest OS is a personal computer OS.

13. A computer storage medium bearing computer-executable instructions, that when executed upon a host computing device, cause the host computing device to perform operations comprising:
   receiving by a network interface device of a host OS incoming data from a network, both the host OS and a guest OS executing on a single host computing device;
   intercepting by a network address translation (NAT) service of the guest OS the incoming data from a network interface device driver of the host OS; and
   identifying by the NAT service a destination operating system that is an ultimate destination for the incoming data, the destination OS being one of the OSes executing on the host computing device.

14. The computer storage medium of claim 13, wherein the destination OS is the host OS.

15. The computer storage medium of claim 13, wherein the destination OS is another guest OS executing on the host computing device.

16. The computer storage medium of claim 13, further bearing computer-executable instructions, that when executed upon a host computing device, cause the host computing device to perform operations:

translating a destination address of the incoming data to a private internal network address of the destination OS; and forwarding the incoming data to a network stack of the destination OS.

17. The computer storage medium of claim 13, further bearing computer-executable instructions, that when executed upon a host computing device, cause the host computing device to perform operations:

receiving by the NAT service outgoing data from an origination OS that is one of the OSes executing on the host computing device;

translating by the NAT service the outgoing data from a private internal network address of the origination OS to a public external Internet Protocol (IP) address; and sending the outgoing data to the network interface device of the host OS for transmission over the network.

18. The computer storage medium of claim 13, wherein the host computing device is a game console, the host OS is a game console operating system, and the guest OS is a personal computer OS.

* * * * *

UNITED STATES PATENT AND TRADEMARK OFFICE
CERTIFICATE OF CORRECTION

| | | |
|---|---|---|
| PATENT NO. | : 8,024,727 B2 | Page 1 of 1 |
| APPLICATION NO. | : 11/454372 | |
| DATED | : September 20, 2011 | |
| INVENTOR(S) | : Taillefer et al. | |

It is certified that error appears in the above-identified patent and that said Letters Patent is hereby corrected as shown below:

In column 12, line 19, in Claim 6, delete "network" and insert --network, --, therefor.

Signed and Sealed this
Twenty-second Day of November, 2011

David J. Kappos
*Director of the United States Patent and Trademark Office*